(12) United States Patent
Stoev (10) Patent No.: US 6,880,873 B2
(45) Date of Patent: Apr. 19, 2005

(54) SUCTION DEVICE FOR REMOVING PET LITTER

(76) Inventor: Stoimen N. Stoev, 5662 Etiwanda Ave. #9, Tarzana, CA (US) 91356

( * ) Notice: Subject to any disclaimer, the term of this patent is extended or adjusted under 35 U.S.C. 154(b) by 112 days.

(21) Appl. No.: 10/154,209

(22) Filed: May 23, 2002

(65) Prior Publication Data
US 2003/0146631 A1 Aug. 7, 2003

Related U.S. Application Data (63) Continuation-in-part of application No. 10/068,155, filed on Feb. 5, 2002, now abandoned.

(51) Int. Cl.⁷ .............................. A01K 29/00; A47L 5/24
(52) U.S. Cl. ......................... 294/1.4; 294/64.1; 15/341; 15/344
(58) Field of Search .......................... 294/1.3–1.5, 64.1; 15/257.1, 330, 341, 344, 347, 352, 415.1; 119/161, 867

(56) References Cited

U.S. PATENT DOCUMENTS

| | | | | |
|---|---|---|---|---|
| 1,141,039 A | * | 5/1915 | Cox | 15/341 |
| 1,146,540 A | | 7/1915 | Winter | |
| 2,274,304 A | * | 2/1942 | Perry | 294/64.1 |
| 3,820,182 A | * | 6/1974 | Vockroth | 15/341 |
| 3,862,468 A | | 1/1975 | Fortune | |
| 4,078,838 A | | 3/1978 | Nadratowski | |
| 4,185,355 A | | 1/1980 | Williams | |
| 4,253,691 A | | 3/1981 | Liu | |
| 4,286,816 A | | 9/1981 | Tobias | |
| 4,372,700 A | * | 2/1983 | Moffitt, Jr. | 15/341 |
| 4,478,448 A | | 10/1984 | Albert | |
| 4,584,733 A | * | 4/1986 | Tietge et al. | 15/1.7 |
| 4,660,249 A | | 4/1987 | Popovic | |
| 5,081,739 A | * | 1/1992 | Kao | 15/341 |
| 5,187,833 A | * | 2/1993 | Bieganski | 15/341 |
| 5,661,873 A | | 9/1997 | Karet | |
| 6,123,046 A | | 9/2000 | Gemeniano | |

FOREIGN PATENT DOCUMENTS

| | | |
|---|---|---|
| EP | 0 510 472 A1 | 4/1992 |
| GB | 2 233 218 A | 1/1991 |
| WO | WO 93/20285 * | 10/1993 |

* cited by examiner

Primary Examiner—Eileen D. Lillis
Assistant Examiner—Paul T. Chin (57) ABSTRACT

A vacuum pump for pet litter comprises a housing and a litter container at one end of the housing. A piston is located in the housing which reciprocates between a first position and a second position wherein movement of the piston from the first position to the second position produces a vacuum in the litter container. The pump includes a spring for urging the piston towards the second position, a handle for moving the piston to the first position and a holding member which holds the piston at the first position. Operation of a release trigger permits the piston to move from the first to the second position.

18 Claims, 9 Drawing Sheets

SUCTION DEVICE FOR REMOVING PET LITTER

CROSS REFERENCE TO RELATED APPLICATIONS

This application is a continuation in-part application of U.S. application Ser. No. 10/068,155 filed Feb. 5, 2002, now abandoned, and incorporated herein by reference in its entirety.

BACKGROUND OF INVENTION

Suction Device for Removing Pet Litter is a device for removing animal's feces from grass surfaces, pavements and other public areas. The present invention is constructed in such a way that it is capable of removing the waste regardless of its consistency. Often, especially when having digestion difficulties, pets' feces are thin in consistency and are difficult to remove with the existing methods and devices.

The existing devices for removing pets' waste address the problem only partially. The most popular way is to dispose manually with the help of a plastic bag wrapped around the owner's hand. Another method specified in U.S. Pat. No. 6,123,046 is to position the device under the defecating animal which is obviously uncomfortable for both the pet and the owner.

The device described in U.S. Pat. No. 4,078,838, consists of a telescopic tube containing a plunger. In the upper end of the plunger a spiral spring is positioned. In the lower end of the plunger there is a slot where a plastic bag specially produced to fit the plunger is placed. When the plunger moves upwards, the plastic bag is drawn in the telescoping tube and is supposed to take the feces it is placed upon with it. This design makes the device difficult to use because the friction between the bag and the feces is not sufficient, especially if the latter is with slight consistency.

BRIEF SUMMARY OF THE INVENTION

The presented invention is a suction device by which pet litter can be removed, regardless of its consistency. It is composed of a waste collecting container, a main cylinder with a piston, a spring positioned along the piston's axis, a mechanism for winding the spring and a trigger used for releasing the spring. The process is performed without the need for the pet's owner to bend over and touch the feces. The use of vacuum allows the device to be efficient regardless of the consistency of the animal litter and the surface area: grass, bushes, or road surface.

DETAILED DESCRIPTION OF THE INVENTION

Figure 1:
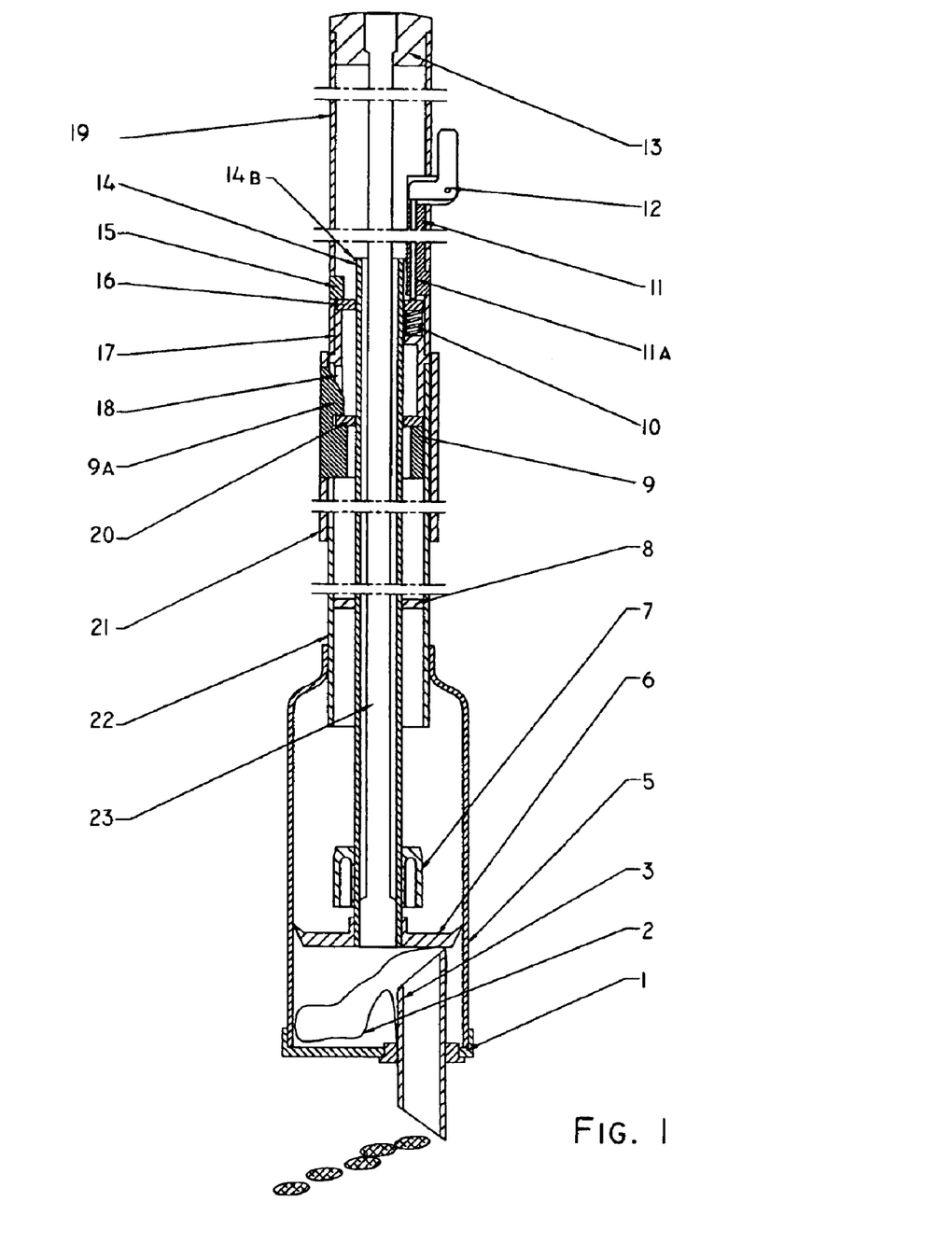
FIG. 1 shows a section of the device along its length, ready for use.

As one can see from the attached drawings, the invention consists of:

A waste collector container composed of a lid 1, a plastic bag 2 and a nozzle 3. The plastic bag is placed within a cylinder 5 and is fixed there using the lid 1. Within the cylinder 5 is positioned a piston consisting of a gasket 6 and a piston rod 14. In the hollow of the piston rod 14 is placed a spring 23. The lower end of the spring 23 is attached to the gasket 6, and its upper end is attached to a lid 13. Along the wall of tube 22 there is a long slit through which passes the connecting rib 9A of component 9 allowing it to be fixed to the cylindrical handle 21. Over component 9 is placed a loading washer 20.

Figure 2:
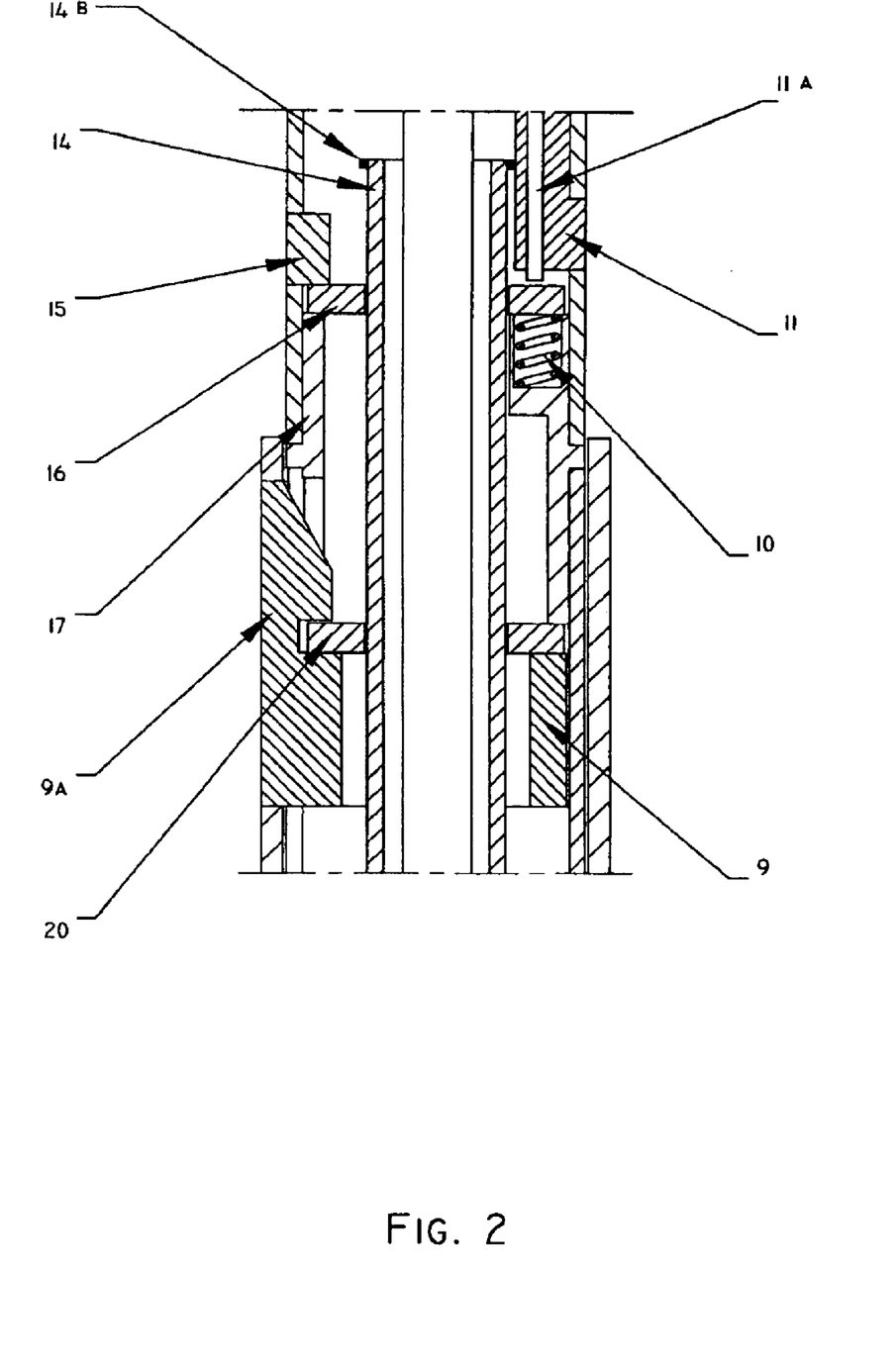
FIG. 2 shows the details of the device used to wind the spring, as well as the trigger.

A connecting cylinder 17 is used to connect the tube 22 and tube 19.The connecting cylinder 17 there is a slit along its length, parallel to the slit in the tube 22. A spring 10 is placed in the upper part of component 17. Above the component 17 is placed a stopping washer 16. Within the wall of tube 19 is incorporated a rib 15 A triggering mechanism 11, comprising a body, an axis 11A and a trigger 12 is fixed to the inside wall of tube 19 diametrically opposite to the rib 5

In the upper end of the piston rod 14 there is a ring 14B, used to restrict its movement downwards when the device is being wound.

The winding of the spring is accomplished by moving a cylindrical handle 21 which forces the rib 9A to press on the loading washer 20, thus placing it out of parallel. In this way the washer is stuck in the piston rod 14 and sets it in motion, while the spring attached to the lower end of the piston rod 14 begins to stretch. When the handle 21 is returned to its initial position, the stopping washer 16 raised by the spring 10 and pressed by the rib 15 in its diametrically opposite end stops the piston rod 14 and does not allow the spring 23 to return the piston in its initial position. This process is repeated several times, depending on the size of the device until the spring has been wound fully and the protecting ring 14B reaches the stopping washer 16 and stops the devices components from disintegrating.

Figure 3:
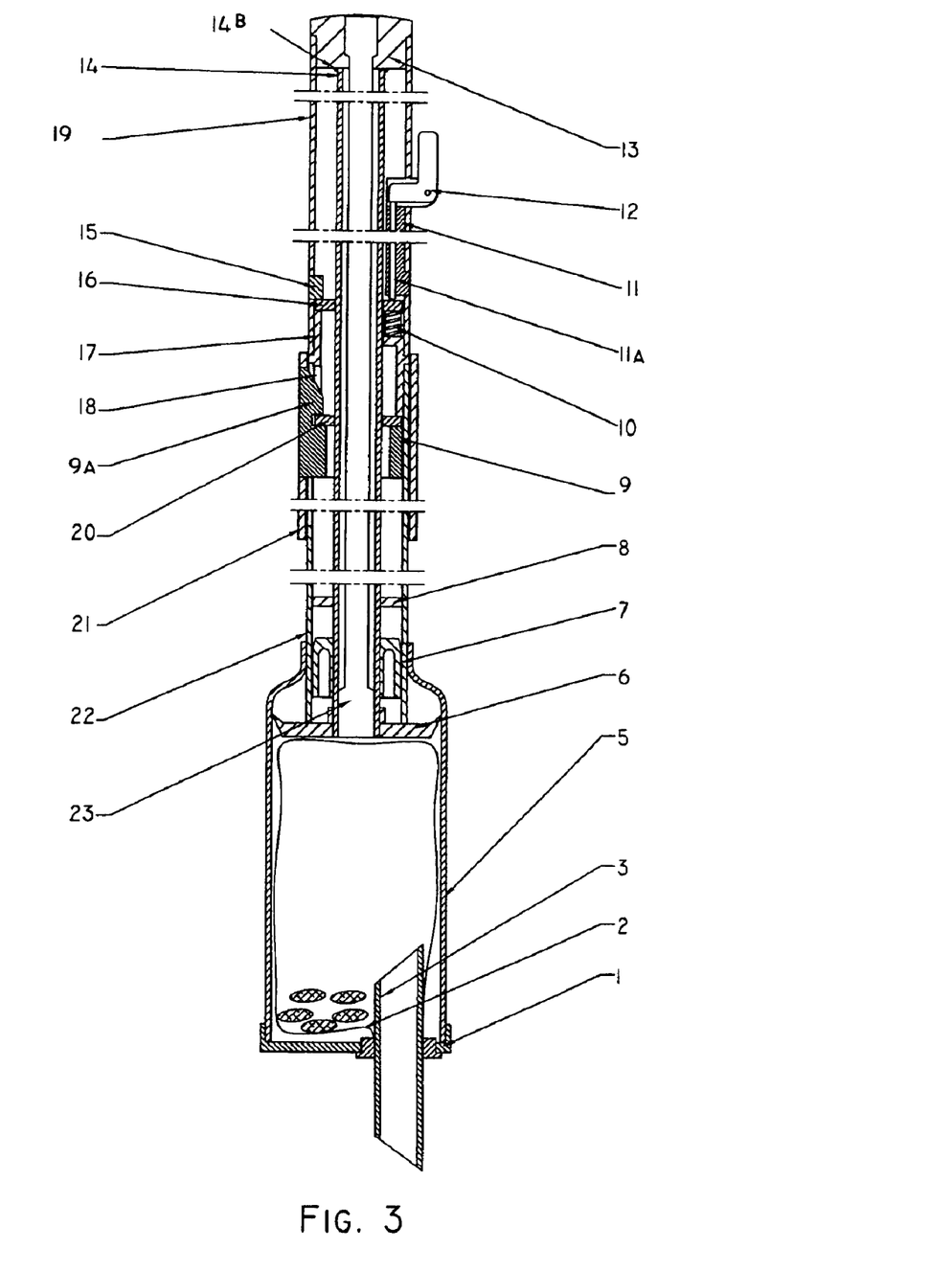
FIG. 3 shows the device after using.

When the assembled device is positioned with the nozzle 3 upon the feces and the trigger is pressed, the axis 11A presses the washer 16 upon the face of the connecting component and makes its opening coaxial to the piston rod 14, thus releasing the piston rod 14. The spring contracts and pulls up the piston, creates the necessary vacuum which sucks the material placed beneath the nozzle 3. In the last phase of the piston's movement, a cushion mechanism is put into action. The air closed between a cylindrical portion 7, which is fixed to the piston rod 14, a filling washer 8 and the lower end of the tube 22, is oozed through the looseness between the components of the cushion mechanism, thus reducing the inertia force of the piston.

Figure 4:
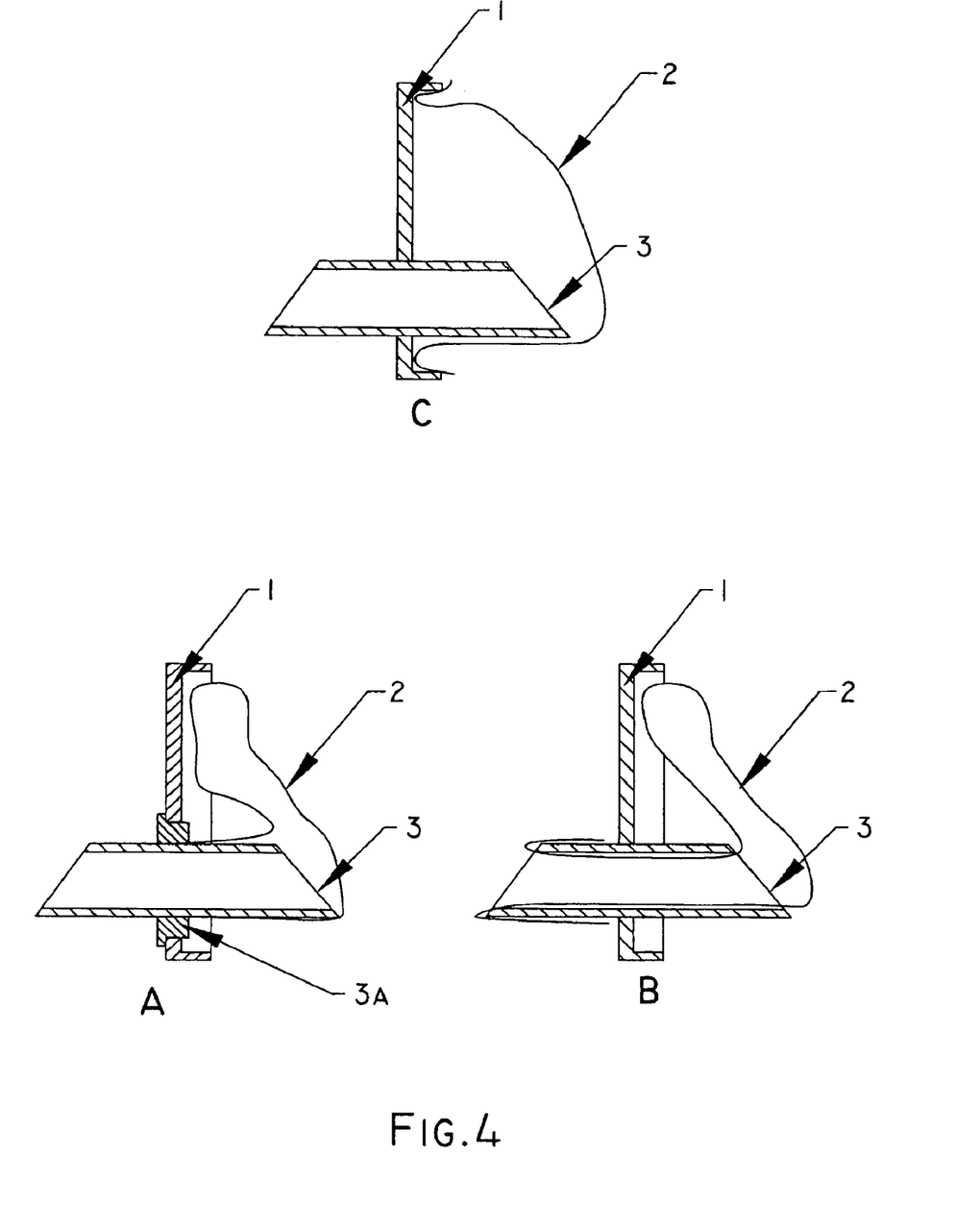
FIGS. 4A, 4B and 4C show different embodiments of a waste collector container.

FIGS. 4A, 4B and 4C show different embodiments of a waste collector container. Each of these FIGS. illustrates a variant with respect to the configuration of the lid 1 and nozzle 3 of the waste collector, as well as the manner in which the plastic bag 2 may be attached to the lid 1 and nozzle 3 in a number of different ways. These are intended to be example illustrations only and any suitable manner for attachment is possible within the scope of the invention.

Figure 5:
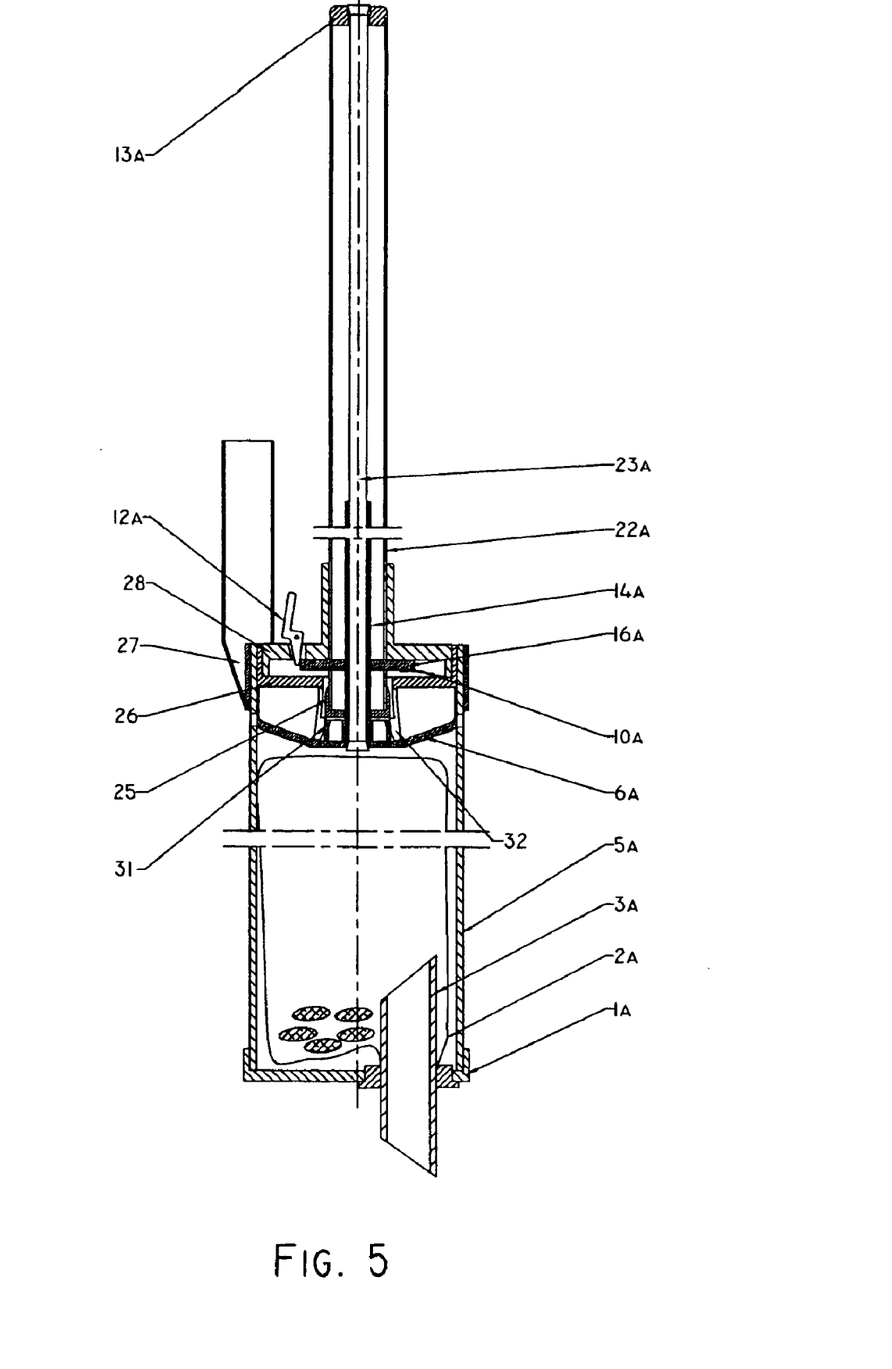
FIG. 5 shows a section of the second proposed design along its length, after using the device.

Another possible design configuration for the invention is shown in FIGS. 5, 6, 7, 8 and 9. As one can see from the drawings, the invention consists of:

A waste collector container composed of a lid 1A, a plastic bag 2A and a nozzle 3A. The plastic bag is placed within a cylinder 5A and is fixed there using the lid 1A. Within the cylinder 5A is positioned a piston consisting of a gasket 6A, and a piston rod 14A. In the hollow of the piston rod 14A is placed a spring 23A. The lower end of the spring 23A is attached to the gasket 6A, and its upper end is attached to a cap 13A. The cap 13A is fixed to the upper end of the tube 22A. Along the wall of the tube 22A there are at least two long slots 29. A sleeve 25 is fixed to the lower end of the tube 22A (see FIG. 8).

To the upper end of the cylinder 5A are fixed two flanges 26 and 28. On the lower flat side of the flange 26 is incorporated an elastically expandable tubular portion having gripping edges 32. To the upper flat surface of the flange 28 is jointly attached a trigger 12A. The lower end of the trigger 12A passes through an opening on the flat wall of the flange 28. Between the flanges 26 and 28 is placed a washer 16A. The washer 16A is designed with a central opening, slightly bigger than the outer diameter of the piston rod 14A, and concentric segmental openings through which pass the remains of the wall of the tube 22A, as shown on FIG. 8. Through the central openings of the flanges 26 and 28 and the segmental openings of the washer 16A passes the tube 22A.

Figure 6:
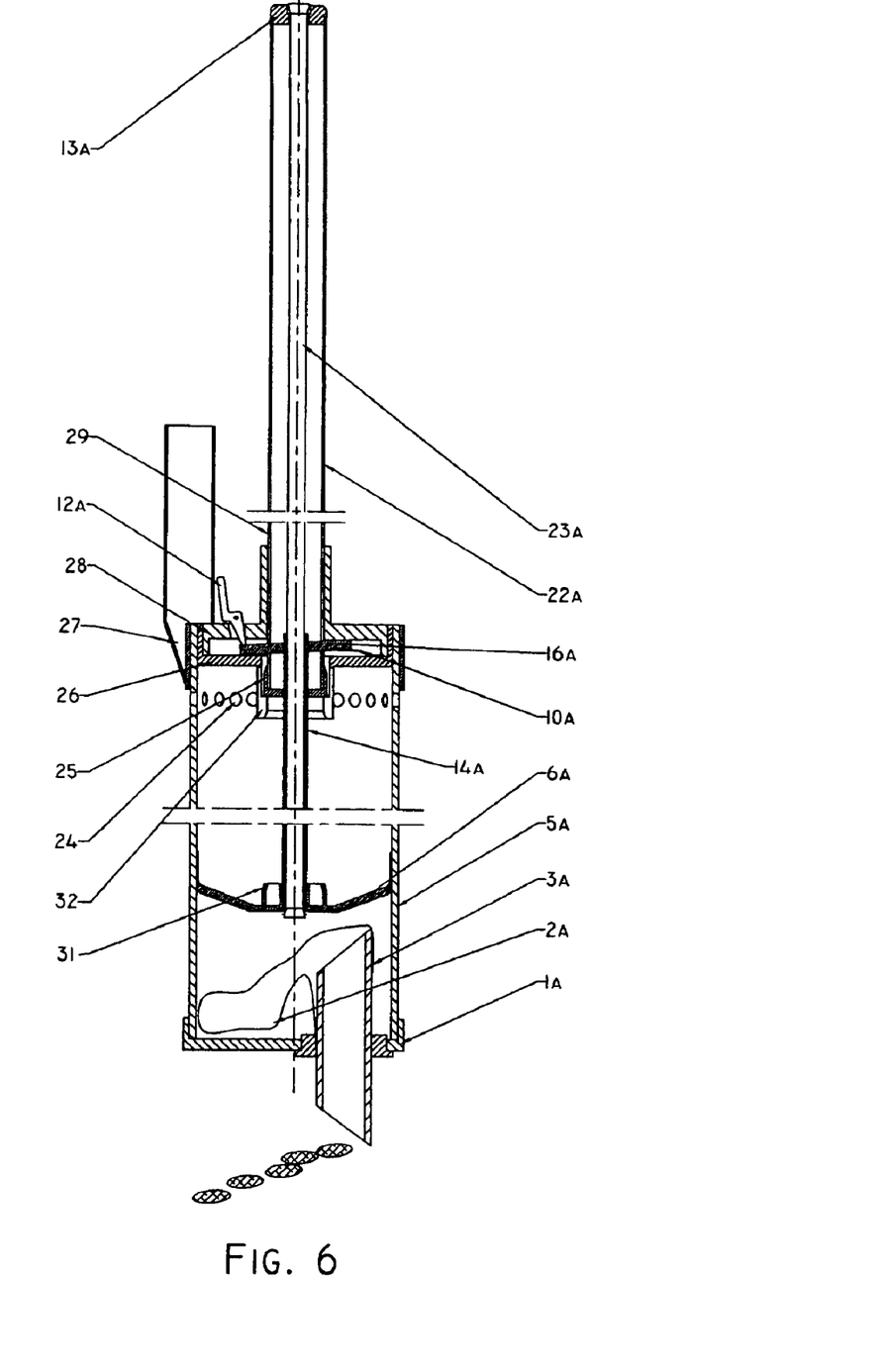
FIG. 6 shows the device from FIG. 5 ready for use.
Figure 7:
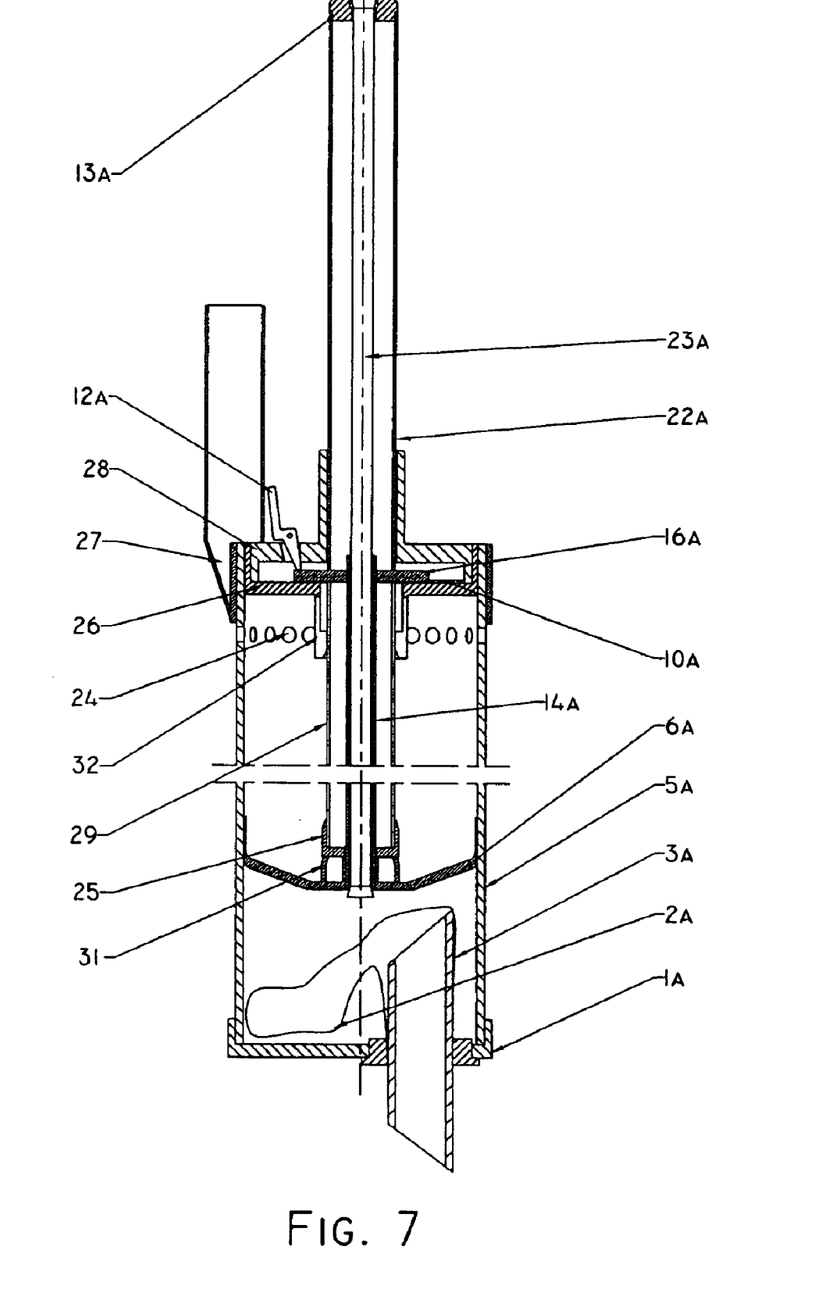
FIG. 7 shows the device from FIG. 5 ready for transport.

In the drawing shown on FIG. 7, the tube 22A and the piston 6A and 14A are placed in its lower position. In this way the upper edges of the slots 29 of the tube 22A press on the washer 16A forcing the spring 10A, thus allowing the trigger 12A to prop upon the washer 16A In this way the piston rod 14A gets fixed in its lower position. While the tube 22A is being pulled up to its upper position, the sleeve 25 passes through the grasping edges 32, and opens them up. When the sleeve 25 passes through the grasping edges 32 they contract, because of the elasticity of the tubular portion and the tube 22A becomes fixed, the spring 23A remains taut and device is ready for use (FIG. 6). When the operator presses on the outer end of the trigger 12A, it rotates around socked joint axis. Inside end of the trigger 12A releases the washer 16A and allows the washer 16A to layover on the lower flat surface of the flange 28. The central opening of the washer 16A becomes coaxial to the piston rod 14A thus releasing it. The piston 6A and 14A, hauling by the spring 23A, moves up and creates a vacuum, which sucks in the litter. The air contained above the piston 6A and 14A flows out through openings 24 located in the upper end of the cylinder 5A. Approximately an inch before the upper position of the piston, the gasket 6A closes the openings 24 and creates an air pillow which slows down the piston 6A and 14A. When the piston 6A and 14A reach its upper position, a cone 31 located in the base of the gasket 6A opens up the grasping edges 32 and releases the tube 22A (see FIG. 5). In this way the tube 22A, together with the piston 6A and 14A can be moved to their lower positions and the procedure can be repeated.

Figure 8:
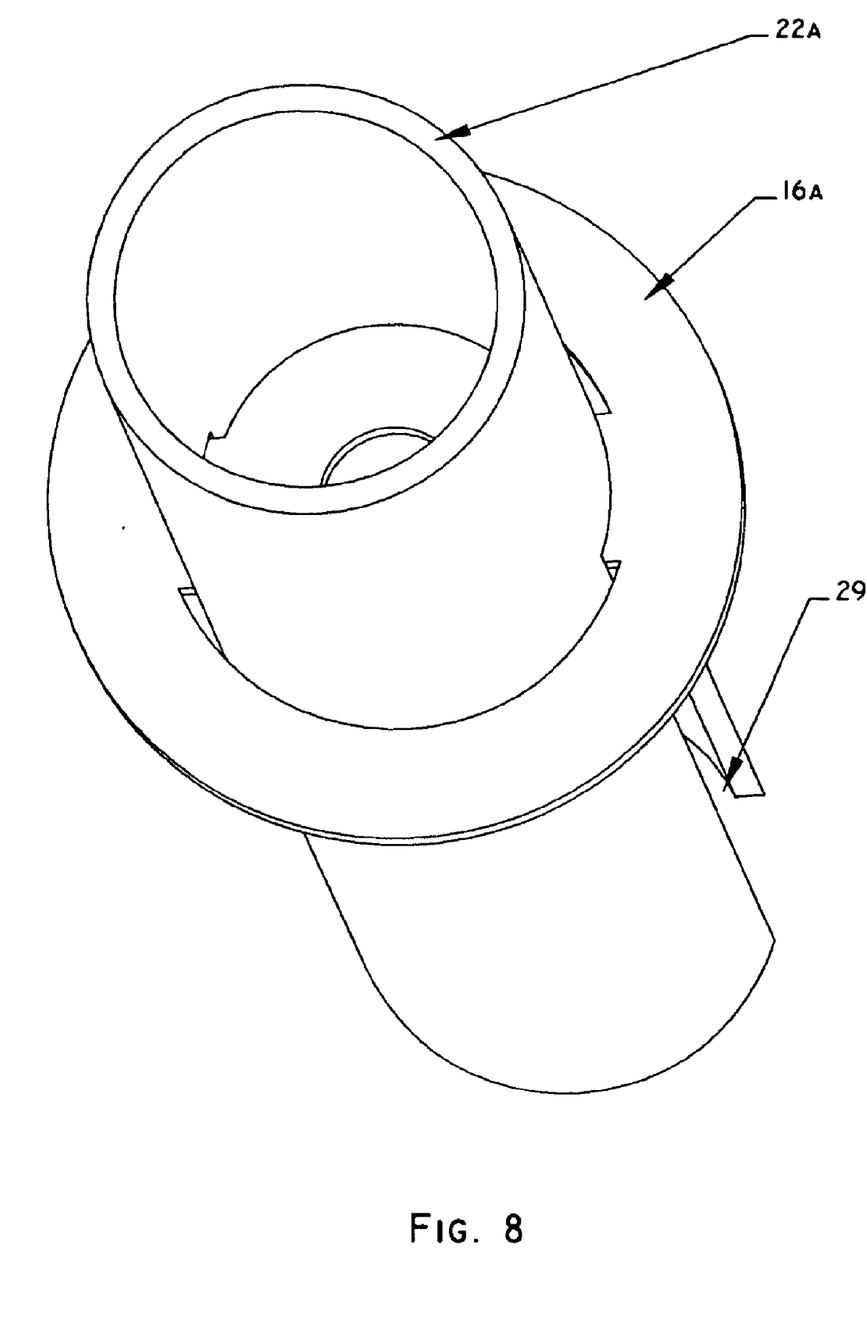
FIG. 8 shows the shape of washer 16A and tube 22A.
Figure 9:
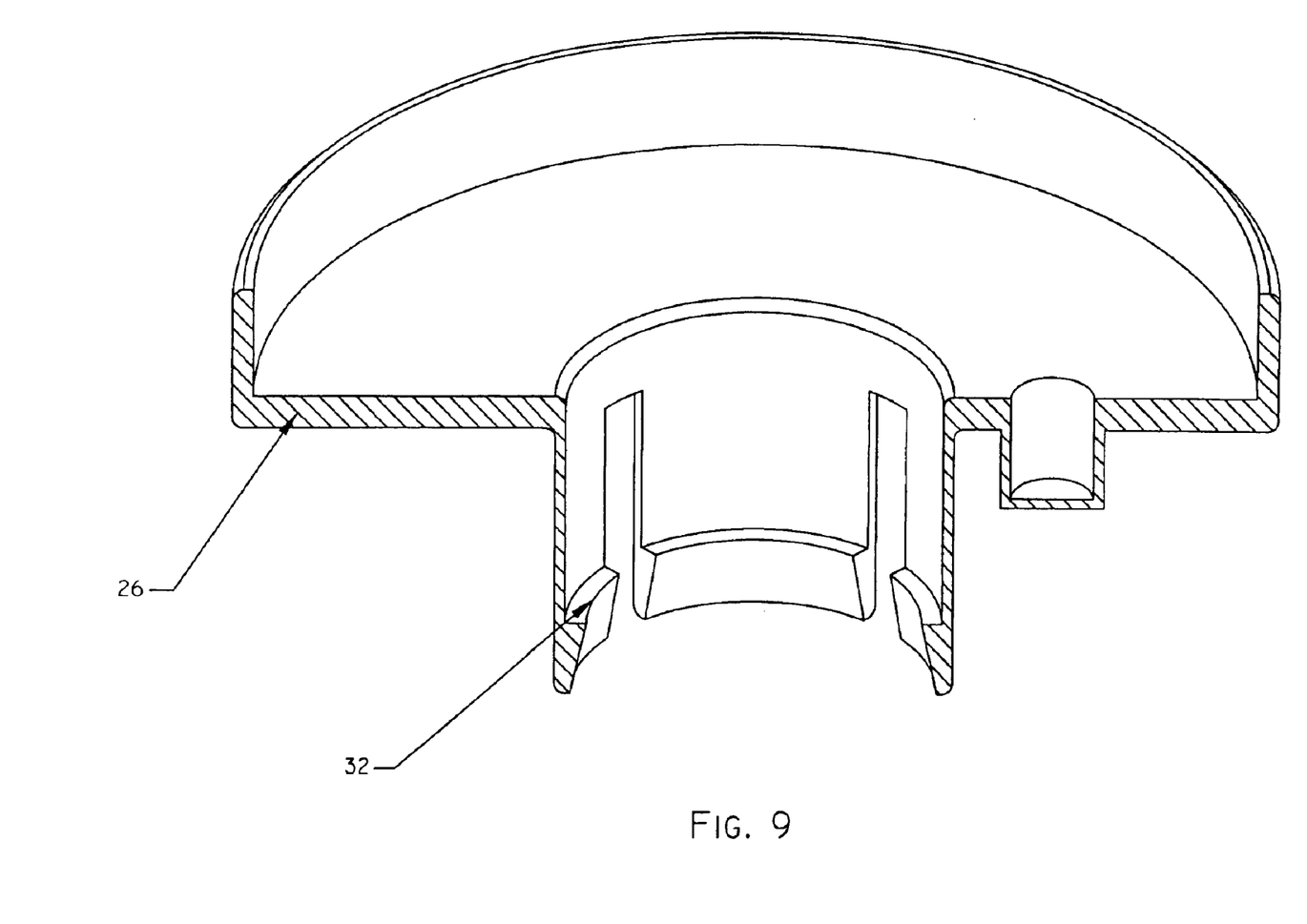
FIG. 9 shows the shape of flange 26.

Along the walls of the tube 22A there are long slots 29, through which pass the extensions of washer 16A, as it can be seen on FIG. 8. To the lower end of the tube 22A is attached inflexibly a tubular portion 25. The handle 27 is attached to the cylinder 5A. On the drawing shown on FIG. 7, the tube 22A and the piston 6A and 14A are placed in lower terminating position. Thus, the measurements of the device are minimized and it is suitable for transportation. This way the slots 29 in the wall of the tube 22A are pressuring the washer 16A forcing the spring 10A, thus allowing the trigger 12A to prop up the washer 16A from the one side. This way the tube 14A is fixed in its lower terminating position. When the tube 22A is pulled to its upper terminating position, the tubular portion 25 opens up the grasping edges in the lower end of the flange 26; the tube 22A is fixed, the spring 23A remains taut and device is ready for use (FIG. 6). The pressing of the trigger 12A allows the washer 16A to lay over the flange 28 and this way its opening become parallel to the tube 14A thus releasing it. The piston 6A and 14A moves up and creates a vacuum, which sucks in the litter. The air contained above the piston 6A and 14A is released through the openings 24 in the upper part of the cylinder 5A. Just before the upper terminating position is reached, the gasket 6A closes this openings and the air pillow that is formed slows down the piston 6A and 14A when it is stopping. When the piston 6A and 14A is in its upper terminating position, the cone 31 located in the base of the gasket 6A opens up the grasping edges 32 of the flange 26 and releases the tube 22A (see FIG. 5). In this way the tube 22A, together with the piston 6A and 14A can be moved to lower terminating position and the whole procedure can be repeated.

What is claimed is:

1. A vacuum pump for pet litter comprising:

a housing;

a litter container in the housing at one and thereof;

a piston having a gasket and a piston rod in the housing which reciprocates between a first position and a second position wherein movement of the piston from the first position to the second position produces a vacuum in the litter container;

means for urging the piston towards the second position;

an elongate means coaxial with the piston rod and extending between the inside of the housing and the outside of the housing for moving the piston to the first position and charging the urging means;

means for holding the piston at said first position;

release means to inactivate the means for holding and thus permit the piston to move from the first to the second position; and the means for moving the piston comprising a cylindrical handle extending to the outside of the housing, the handle being reciprocal along an axis which substantially corresponds with that of the piston; a gripping member connected to the cylindrical handle, the gripping member releasably engaging the piston rod; the handle being movable between a first and second position whereby movement of the handle from the first position to the second position causes the gripping member to engage the piston rod to move the piston against the action of the means for urging from the second position of the piston to first position thereof.

2. A vacuum pump as claimed in claim 1 wherein the housing comprises a tube one end of which is connected to an upper end of the housing, the piston rod being capable of reciprocating within the tube and in a direction substantially coaxial with the tube.

3. A vacuum pump as claimed in claim 1 wherein the litter container comprises a nozzle extending from the housing to the exterior so that, in use, the nozzle is held over the litter.

4. A vacuum pump as claimed in claim 1 wherein the piston rod within the housing has a gasket at one end of the piston rod which extends towards the litter container.

5. A vacuum pump as claimed in claim 1 wherein the means for urging comprises a spring which forces the piston into the second position.

6. A vacuum pump as claimed in claim 1 wherein the means for holding the piston comprises a stop washer which holds the piston rod in the position to which it has been moved by the cylindrical handle.

7. A vacuum pump as claimed in claim 6 wherein the release means comprises a trigger member extending between the outside of the tube and the stop washer, the trigger inactivating the stop washer to permit the piston to move from the first to the second position.

8. A vacuum pump as claimed in claim 6 wherein the stop washer has a central aperture with inner edges through which the piston rod reciprocates, the washer being movable between an unlocking position wherein it is substantially coaxial with the piston rod, and a locking position, where the washer is slightly displaced so that the inner edges thereof grip the piston rod to prevent movement thereof.

9. A vacuum pump as claimed in claim 6, wherein the release means comprises a trigger member extending between the outside of the housing and the washer, the trigger releasing the washer so it can move from the locking to the unlocking position.

10. A vacuum pump as claimed in claim 1 wherein the release means comprises a trigger member extending from the outside of the housing to the means for holding the piston, the trigger member inactivating the means for holding so that the piston can move by the action of the means for urging from the first position to the second position.

11. A vacuum pump as claimed in claim 1 further comprising cushioning means for cushioning the movement of the piston as the piston nears the second position.

12. A vacuum pump as claimed in claim 11 wherein the cushioning means comprises a cushioning tube having one open end within the housing, and a cylindrical portion on the piston, the cylindrical being received within the cushioning tube, the outer diameter of the piston being slightly less than the inside diameter of the cushioning tube.

13. A vacuum pump as claimed in claim 11 wherein the cushioning means further comprises at least one aperture in the housing through which air can be expelled when the piston moves from the first to the second position thereof, the aperture in the housing being closed to further expulsion of air when the piston nears the second position.

14. A vacuum pump as claimed in claim 1 wherein the cylindrical handle moves the piston in increments from the second position thereof to the first position thereof.

15. A vacuum pump for pet litter removing comprising:
   a housing having outflow aperture in its upper end;
   a litter container in the housing at one end thereof;
   a piston, having a gasket and a piston rod, the piston reciprocates between a first position and a second position wherein movement of the piston from the first position to the second position produces a vacuum;
   means for urging the piston towards the second position;
   means for moving the piston from second to first position and loading the means for urging, having a tubular portion on its lower end;
   a hold-and-release member for controlling movement of the means for moving, the hold-and-release member having an expandable tubular portion in the upper end of the housing, the means for moving passing through the expendable tubular portion so that the expandable tubular portion is contracted when the means for moving is in the second position, so that the expandable tubular portion locks the means for moving to thereby prevent movement thereof, the expandable tubular portion, being slightly expandable, is expanded again by a cone located in a base of the gasket when the piston is in the second position, thus releasing the means for moving;
   means for holding the piston rod at said first position, and releasing it;
   release means to inactivate the means for holding and thus permit the piston to move from the first to the second position; and
   a handle fixed on the upper end of the housing.

16. A vacuum pump as claimed in claim 15 wherein the means for moving the piston has longitude slots through a wall about the piston.

17. A vacuum pump as claimed in claim 15 wherein the means for holding the piston rod comprises a washer having a central aperture with inner edges through which the piston rod reciprocates, and coaxial openings through which freely reciprocates the remains of wall of the means for moving, the washer being movable between an unlocking position wherein it central aperture is substantially coaxial with the piston rod, and a locking position, where the washer is slightly displaced so that the inner edges thereof grip the piston rod to prevent movement thereof.

18. A vacuum pump as claimed in claim 15 wherein the release means comprises:
   a lever socket to the upper end of the housing being capable to hold the washer in its locking position, and releases it to its unlocking position, and
   a spring hoisting the washer in its locking position.

* * * * *